(12) United States Patent
Minamisawa et al.

(10) Patent No.: US 10,948,737 B2
(45) Date of Patent: Mar. 16, 2021

(54) OPTICAL UNIT WITH SHAKE CORRECTION FUNCTION HAVING SWING SUPPORTING MECHANISM PERMITTING A TILTING POSTURE

(71) Applicant: NIDEC SANKYO CORPORATION, Nagano (JP)

(72) Inventors: Shinji Minamisawa, Nagano (JP); Takeshi Sue, Nagano (JP); Masato Gomyo, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 288 days.

(21) Appl. No.: 16/029,669

(22) Filed: Jul. 9, 2018

(65) Prior Publication Data
US 2019/0018259 A1  Jan. 17, 2019

(30) Foreign Application Priority Data

Jul. 12, 2017 (JP) .............................. JP2017-136034

(51) Int. Cl.
| | |
|---|---|
| *G02B 27/64* | (2006.01) |
| *G03B 5/06* | (2006.01) |
| *G03B 3/10* | (2021.01) |
| *H04N 5/232* | (2006.01) |

(52) U.S. Cl.
CPC ............. *G02B 27/646* (2013.01); *G03B 5/06* (2013.01); *G03B 3/10* (2013.01);
(Continued)

(58) Field of Classification Search
CPC .................. G02B 27/646; G03B 3/10; G03B 2205/0015; G03B 2205/0023;
(Continued)

(56) References Cited

U.S. PATENT DOCUMENTS

| | | |
|---|---|---|
| 6,112,028 A | 8/2000 | Okada |
| 2007/0127904 A1 | 6/2007 | Iwasaki et al. |
| 2012/0188441 A1* | 7/2012 | Takizawa ............. H04N 5/2251 348/374 |

FOREIGN PATENT DOCUMENTS

| | | |
|---|---|---|
| CN | 102016709 | 4/2011 |
| CN | 102483557 | 5/2012 |

(Continued)

OTHER PUBLICATIONS

"Office Action of Taiwan Counterpart Application," dated Jun. 10, 2019, with English translation thereof, p. 1-p. 5.
(Continued)

*Primary Examiner* — Ryan S Dunning
(74) *Attorney, Agent, or Firm* — JCIPRNET

(57) ABSTRACT

An optical unit with shake correction function capable of reducing a weight of a rotation member to be rotated in rolling correction. An optical unit with shake correction function includes: a movable member; a swing supporting mechanism supporting the movable member such that the movable member is able to swing; and a fixation member supporting the movable member via the swing supporting mechanism. The movable member includes: an imaging module; a rotation seat supporting the imaging module; a rotation supporting mechanism supporting the rotation seat such that the rotation seat is able to rotate on an optical axis of the imaging module; a supporting member supporting the rotation seat via the rotation supporting mechanism; and a rolling magnetic driving mechanism causing the rotation seat to rotate. The imaging module and the rotation seat configure the rotation member to be rotated by the rolling magnetic driving mechanism.

10 Claims, 9 Drawing Sheets

(52) U.S. Cl.
CPC ............... *G03B 2205/0023* (2013.01); *G03B 2205/0069* (2013.01); *H04N 5/23287* (2013.01)

(58) Field of Classification Search
CPC .... G03B 2205/0038; G03B 2205/0069; G03B 5/06; H04N 5/22521; H04N 5/2253; H04N 5/2254; H04N 5/2257; H04N 5/23287
USPC ........................................................ 359/557
See application file for complete search history.

(56) References Cited

FOREIGN PATENT DOCUMENTS

| | | |
|---|---|---|
| CN | 102736358 | 10/2012 |
| CN | 103226231 | 7/2013 |
| CN | 103926780 | 7/2014 |
| CN | 105556383 | 5/2016 |
| CN | 105824165 | 8/2016 |
| JP | H0961880 | 3/1997 |
| JP | 2000187260 | 7/2000 |
| JP | 2012032525 | 2/2012 |
| JP | 2015-064501 | 4/2015 |
| JP | 2015-082072 | 4/2015 |
| JP | 2016061985 | 4/2016 |
| WO | 2014083894 | 6/2014 |
| WO | 2015133731 | 9/2015 |

OTHER PUBLICATIONS

"Office Action of China Counterpart Application", dated Jun. 19, 2020, with English translation thereof, pp. 1-15.

\* cited by examiner

OPTICAL UNIT WITH SHAKE CORRECTION FUNCTION HAVING SWING SUPPORTING MECHANISM PERMITTING A TILTING POSTURE

CROSS REFERENCE TO RELATED APPLICATION

The present application claims priority under 35 U.S.C. § 119 to Japanese Application No. 2017-136034 filed Jul. 12, 2017, the entire content of which is incorporated herein by reference.

BACKGROUND

Field of the Invention

The present invention relates to an optical unit with shake correction function that causes an imaging module to swing or rotate to perform shake correction on a captured image.

Description of the Related Documents

Some optical units that are mounted on a mobile object such as a cellular phone, a vehicle or an unmanned helicopter, include a shake correction function, which causes an imaging module to swing in order to correct the shake, so as to reduce jitter in a captured image, which is caused by swing of the optical unit. Patent Literature 1 discloses an optical unit with shake correction function including: an imaging module that includes an optical element and an imaging element; a swing supporting mechanism that supports the imaging module such that the imaging module is able to swing; a fixation member that supports a movable member from an outer circumferential side via the swing supporting mechanism; and a swing magnetic driving mechanism that causes the movable member to swing. The swing supporting mechanism supports the imaging module such that the imaging module is able to swing in a range between a reference posture, in which a predetermined axis corresponds to an optical axis of the optical element, and a tilting posture, in which the optical axis tilts relative to the axis. The swing magnetic driving mechanism includes: a swing driving coil that is fixed to the imaging module; and a swing driving magnet that is fixed to the fixation member and is opposed to the coil.

An optical unit is sometimes required, in accordance with its usage, to perform rolling correction for causing an imaging module to rotate on an optical axis. Patent Literature 2 discloses an optical unit with shake correction function that causes an imaging module to swing and functions as a rotation member as a whole. The rotation member is supported such that the rotation member is able to rotate on an axis. Furthermore, the rotation member is rotated by a rolling magnetic driving mechanism.

[Patent Literature 1]
Japanese Unexamined Patent Application Publication No. 2015-64501
[Patent Literature 2]
Japanese Unexamined Patent Application Publication No. 2015-82072

In order to cause the rotation member to rotate, the rotation member being the entire optical unit with shake correction function that causes the imaging module to swing, the weight of the rotation member increases since the rotation member includes the swing supporting mechanism and the swing magnetic driving mechanism. Therefore, there arises a problem in that a reduction in followability due to increased inertia generated on the rotation member at the time of rolling correction hinders the rolling correction from being performed with good accuracy. Furthermore, there also arises a problem in that the rolling magnetic driving mechanism causes the rotation member to rotate with increased power consumption.

In view of the above problems, an object of at least an embodiment of the present invention is to provide an optical unit with shake correction function that is capable of reducing the weight of a rotation member to be rotated in rolling correction.

SUMMARY

To solve the above problems, an optical unit with shake correction function according to at least an embodiment of the present invention includes: a movable member that includes an imaging module including an optical element and an imaging element, a rotation member configured to support the imaging module, a rotation supporting mechanism configured to support the rotation member such that the rotation member is able to rotate on an optical axis of the imaging module, a supporting member configured to support the rotation member via the rotation supporting mechanism, and a rolling magnetic driving mechanism configured to cause the rotation member to rotate; a swing supporting mechanism that supports the movable member such that the movable member is able to swing in a range between a reference posture, in which a predetermined axis corresponds to the optical axis of the imaging module, and a tilting posture, in which the optical axis tilts relative to the axis; a fixation member that supports the movable member via the swing supporting mechanism; and a swing magnetic driving mechanism that causes the movable member to swing.

According to at least an embodiment of the present invention, the imaging module and the rotation member configure the rotation member to be rotated on the optical axis by the rolling magnetic driving mechanism. Further, the rotation member does not include the swing supporting mechanism and the swing magnetic driving mechanism for swinging the imaging module. It is therefore possible to easily reduce the weight of the rotation member as compared with a case where the swing supporting mechanism and the swing magnetic driving mechanism rotate together with the imaging module. It is thus possible to suppress an increase of inertia generated on the rotation member in rolling correction. It is therefore possible to improve followability and to easily perform rolling correction with good accuracy. It is also possible to prevent an increase of the weight of the rotation member, and it is therefore possible to reduce power consumption for rotating the rotation member in the rolling magnetic driving mechanism. On the other hand, the optical unit includes: the fixation member that supports the movable member including the rotation member (i.e., the imaging module) via the swing supporting mechanism such that the movable member is able to swing; and the swing magnetic driving mechanism that causes the movable member to swing. The optical unit is therefore capable of performing swing correction.

In at least an embodiment of the present invention, it is preferable that the rolling magnetic driving mechanism includes: a rolling driving coil that is provided on either one of the rotation member and the supporting member; and a rolling driving magnet that is provided on the other one of the rotation member and the supporting member, and the rolling driving coil and the rolling driving magnet are opposed to each other in an optical axis direction. In the above way, it is possible to avoid the movable member from becoming large in size in a direction orthogonal to the optical axis.

In at least an embodiment of the present invention, it is preferable that the swing magnetic driving mechanism includes: a swing driving coil that is provided on either one of the supporting member and the fixation member; and a swing driving magnet that is provided on the other one of the supporting member and the fixation member, and the swing driving coil is opposed to the swing driving magnet in a direction orthogonal to the axis. In the above way, it is possible to avoid the optical unit with shake correction function from becoming large in size in the optical axis direction.

In at least an embodiment of the present invention, the swing magnetic driving mechanism may be located closer to an object side than the rolling magnetic driving mechanism. In the above way, it is possible to locate the swing magnetic driving mechanism and the rolling magnetic driving mechanism at positions spaced away from each other in the axial direction.

In at least an embodiment of the present invention, in order to configure the rolling magnetic driving mechanism, the rotation member may support the imaging module from a counter object side, the supporting member may include a supporting part that is opposed to the rotation member from the counter object side, and either one of the rolling driving coil and the rolling driving magnet may be held by the rotation member while the other one of the rolling driving coil and the rolling driving magnet may be held by the supporting part.

In at least an embodiment of the present invention, in order to configure the swing magnetic driving mechanism, the imaging module may include a mirror cylinder that holds the optical element, the supporting member may include a sidewall part that is located on an outer circumferential side of the mirror cylinder, the fixation member may include a cylinder member that is located on the outer circumferential side of the mirror cylinder and on an outer circumferential side of the sidewall part, and either one of the swing driving coil and the swing driving magnet may be held by the sidewall part while the other one of the swing driving coil and the swing driving magnet may be held by the cylinder member.

In at least an embodiment of the present invention, it is preferable that the fixation member includes a stopper part that is abutted against the supporting member to restrain a swing range of the movable member when the movable member swings. In the above way, it is possible to restrain the swing range of the movable member.

In at least an embodiment of the present invention, it is preferable that the swing magnetic driving mechanism is located closer to an object side than the rolling magnetic driving mechanism, and the stopper part is arranged between the swing magnetic driving mechanism and the rolling magnetic driving mechanism in an optical axis direction. In the above way, it is possible to arrange the stopper part in a space between the swing magnetic driving mechanism and the rolling magnetic driving mechanism, and it is therefore possible to avoid the optical unit from becoming large in size.

In at least an embodiment of the present invention, it is preferable that a frame-shaped member formed with a tilting surface is fixed to the fixation member, and the stopper part restrains the swing range of the movable member when the tilting surface is abutted against the movable member. In the above way, it is possible to achieve surface contact by setting an angle of the tilting surface in accordance with the swing range, and it is therefore possible to avoid the movable member from becoming deformed because of dispersion of stress at the time of abutment, as compared with a case of point contact.

In at least an embodiment of the present invention, it is preferable that the frame-shaped member is configured with a pair of swing supporting parts that configure a swing center line of the swing supporting mechanism. In the above way, the swing supporting mechanism and the stopper part configured on the fixation member side can be used together. It is therefore unnecessary to provide a stopper member as a separate component.

According to at least an embodiment of the present invention, the imaging module and the rotation member configure the rotation member to be rotated on the optical axis by the rolling magnetic driving mechanism. Further, the rotation member does not include the swing supporting mechanism and the swing magnetic driving mechanism for swinging the imaging module. It is therefore possible to reduce the weight of the rotation member.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The following description explains an embodiment of an optical unit to which at least an embodiment of the present invention is applied, with reference to the drawings.

(Overall Configuration)

Figure 1:
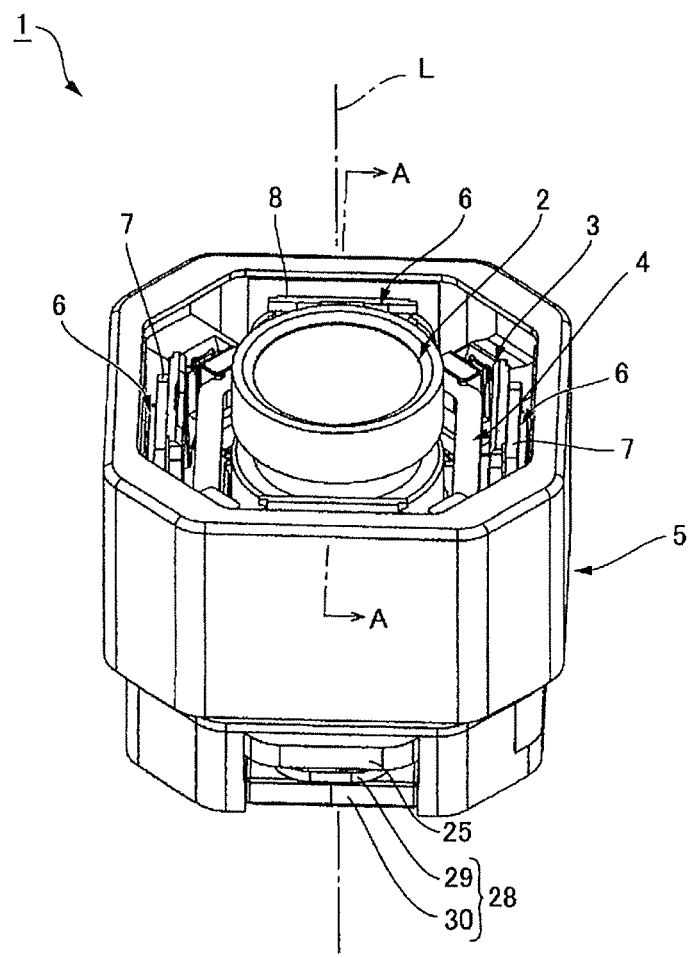
FIG. 1 is a perspective view of an optical unit to which at least an embodiment of the present invention is applied, in which the optical unit is seen from an object side.
Figure 1:
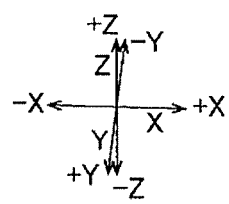
Figure 2:
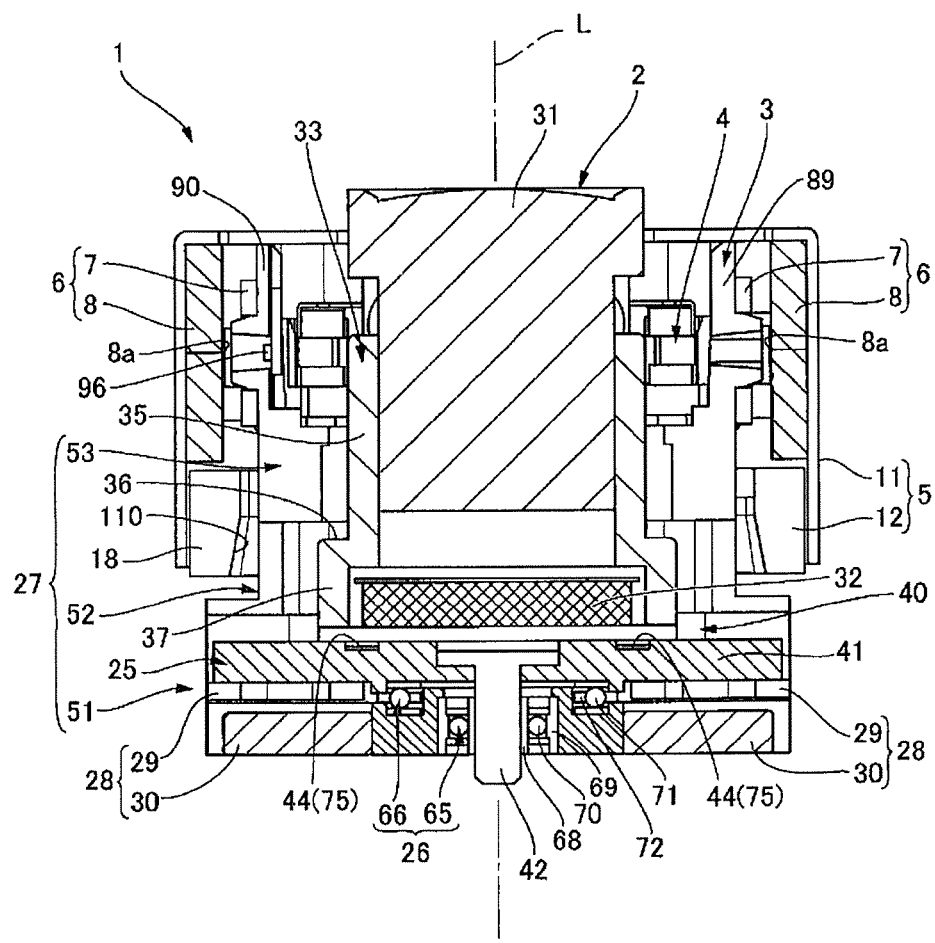
FIG. 2 is a cross-sectional view of the optical unit taken along a line A-A of FIG. 1.
Figure 2:
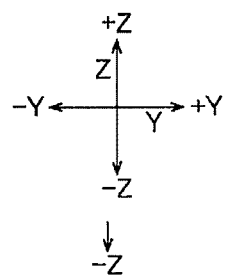
Figure 3:
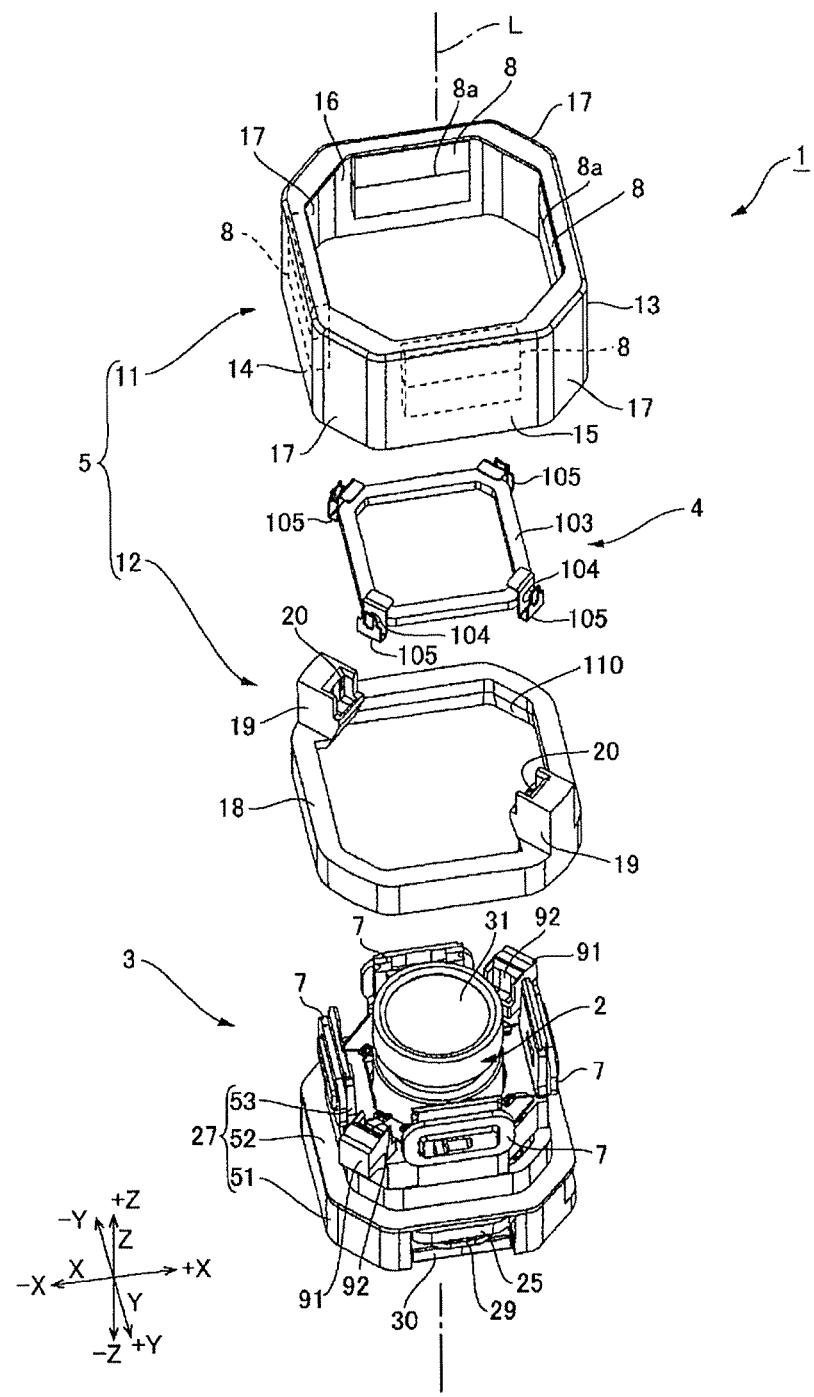
FIG. 3 is an exploded perspective view of the optical unit of FIG. 1, in which the optical unit is seen from the object side.
Figure 4:
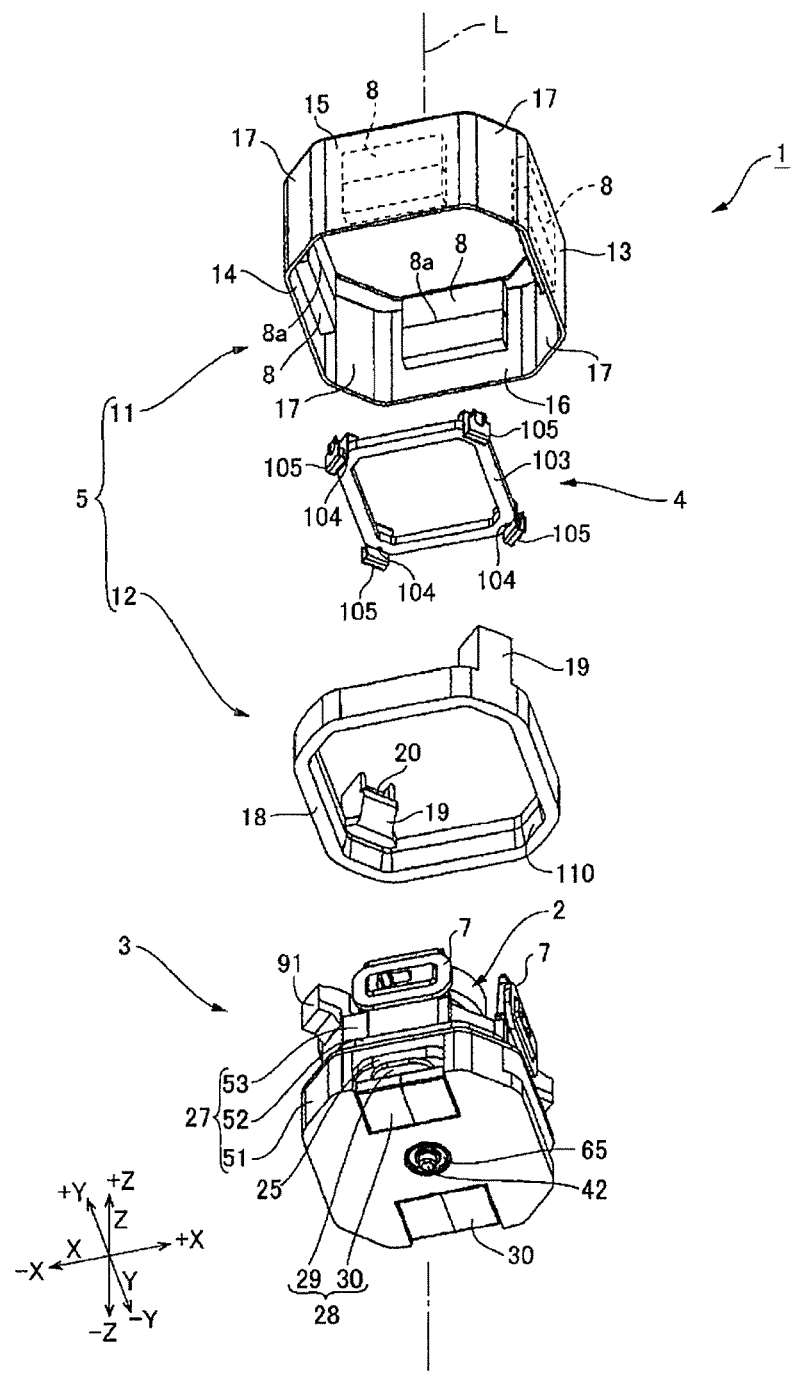
FIG. 4 is an exploded perspective view of the optical unit of FIG. 1, in which the optical unit is seen from a counter object side.

FIG. 1 is a perspective view of an optical unit to which at least an embodiment of the present invention is applied, in which the optical unit is seen from an object side. FIG. 2 is a cross-sectional view of the optical unit taken along a line A-A of FIG. 1. FIG. 3 is an exploded perspective view of the optical unit of FIG. 1, in which the optical unit is seen from the object side. FIG. 4 is an exploded perspective view of the optical unit of FIG. 1, in which the optical unit is seen from a counter object side. For example, an optical unit 1 illustrated in FIG. 1 is utilized for an optical device such as a cellular phone device with camera or a drive recorder, or for an optical device such as an action camera or a wearable camera mounted on a mobile object such as a helmet, a bicycle or a radio control helicopter. Regarding such an optical device, shake of the optical device when capturing an image causes occurrence of jitter in the captured image. The optical unit 1 in the present embodiment is an optical unit with shake correction function for correcting tilt and rotation of a mounted imaging module 2, so as to avoid jitter in a captured image.

As illustrated in FIG. 1, the optical unit 1 includes: a movable member 3 that includes the imaging module 2; a swing supporting mechanism 4 that supports the movable member 3 such that the movable member 3 is able to swing; and a fixation member 5 that supports the movable member 3 from an outer circumferential side via the swing supporting mechanism 4. The imaging module 2 is inserted from the counter object side into the fixation member 5, and has an object side-end protruding from the fixation member 5. The swing supporting mechanism 4 has a gimbal mechanism. The swing supporting mechanism 4 supports the movable member 3 such that the movable member 3 is able to swing in a range between a reference posture, in which a predetermined axis L corresponds to an optical axis of the imaging module 2, and a tilting posture, in which the optical axis of the imaging module 2 tilts relative to the axis L.

As illustrated in FIG. 2, the optical unit 1 also includes a swing magnetic driving mechanism 6 that causes the movable member 3 to swing. The swing magnetic driving mechanism 6 includes: swing driving coils 7 that are held by the movable member 3; and swing driving magnets 8 that are held by the fixation member 5. The swing driving coils 7 and the swing driving magnets 8 are opposed to each other in a radial direction of the optical unit 1, the radial direction being orthogonal to the axis L.

In the present specification, directions of three axes X, Y and Z are orthogonal to each other. Further, one side of the X-axis direction is indicated by +X and the other side is indicated by −X. Further, one side of the Y-axis direction is indicated by +Y and the other side is indicated by −Y. Further, one side of the Z-axis direction is indicated by +Z and the other side is indicated by −Z. The Z-axis direction is an axis L direction of the optical unit 1 and is also an optical axis direction of the imaging module 2 in a state where the movable member 3 is in the reference posture. The +Z direction is the object side of the optical unit 1 and the −Z direction is the counter object side (i.e., an image side) of the optical unit 1.

(Fixation Member)

As illustrated in FIGS. 3 and 4, the fixation member 5 includes: a cylinder member 11 that is in an octagonal shape, in which the cylinder member 11 is seen from the Z-axis direction; and a frame-shaped member 12 that is fixed to an inside of the cylinder member 11. The cylinder member 11 is formed of magnetic material. The frame-shaped member 12 is formed of resin material.

The cylinder member 11 includes: side plates 13 and 14 that are opposed to each other in the X-axis direction; side plates 15 and 16 that are opposed to each other in the Y-axis direction; and side plates 17 that are provided at four corners, each of which faces diagonally at 45 degrees relative to the X-axis direction and the Y-axis direction. The swing driving magnets 8 are respectively held on inner circumferential surfaces of the side plates 13 and 14, which are opposed to each other in the X-axis direction, and to inner circumferential surfaces of the side plates 15 and 16, which are opposed to each other in the Y-axis direction. Each of the swing driving magnets 8 is polarized and magnetized in the Z-axis direction. A magnetization polarized line 8a of each swing driving magnet 8 extends in a direction orthogonal to the axis L in a circumferential direction. The swing driving magnets 8 are fixed with an adhesive to the cylinder member 11.

The frame-shaped member 12 includes: a frame part 18 that is in an octagonal shape and is fitted to a lower end portion of the cylinder member 11; and a pair of arm parts 19 that respectively protrude from end portions of the frame part 18 in the +X direction and +Y direction and from end portions of the frame part 18 in the −X direction and −Y direction, toward the +Z direction. First swing supporting parts 20 for the swing supporting mechanism 4 are respectively provided on the end portions of the arm parts 19 in the +Z direction. The details of the swing supporting mechanism 4 will be described later.

(Movable Member)

Figure 5:
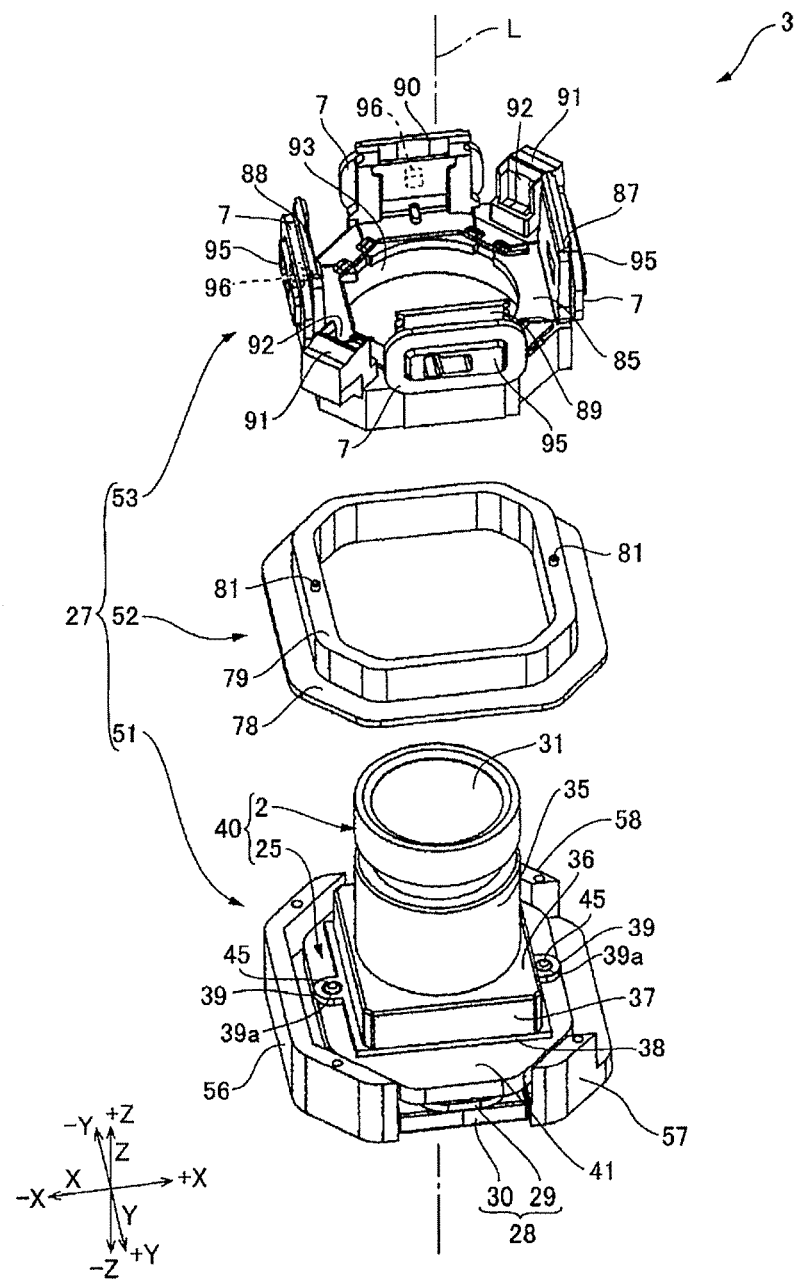
FIG. 5 is an exploded perspective view of a movable member, in which the movable member is seen from the object side.
Figure 6:
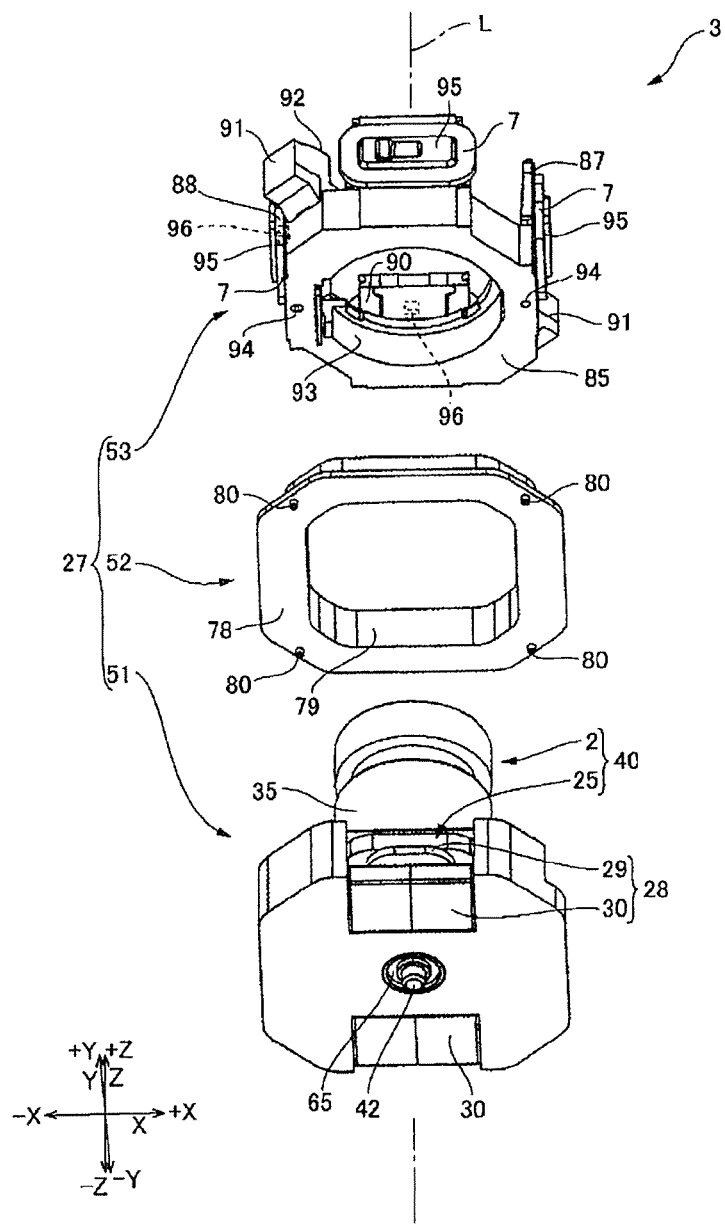
FIG. 6 is an exploded perspective view of the movable member, in which the movable member is seen from the counter object side.
Figure 7:
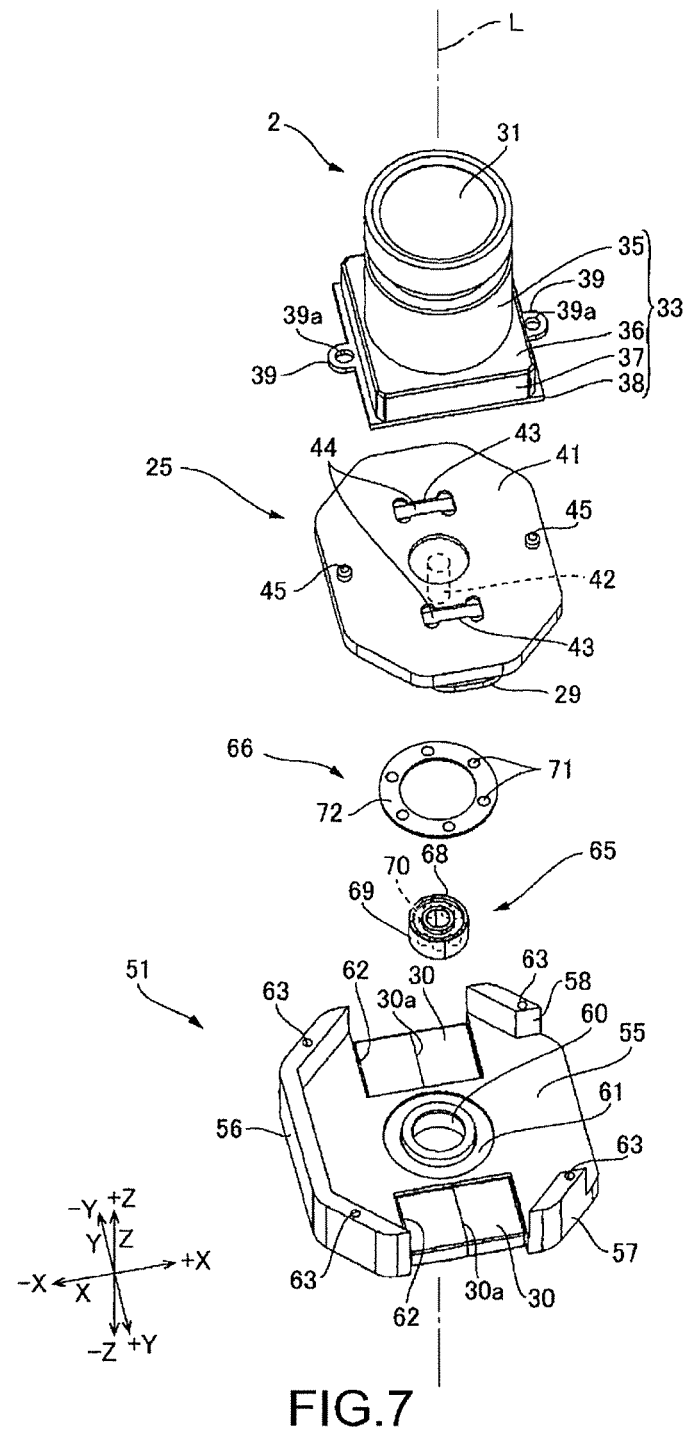
FIG. 7 is an exploded perspective view of an imaging module, a rotation seat, a rotation supporting mechanism, and a supporting member, in which the imaging module, the rotation seat, the rotation supporting mechanism, and the supporting member are seen from the object side.
Figure 8:
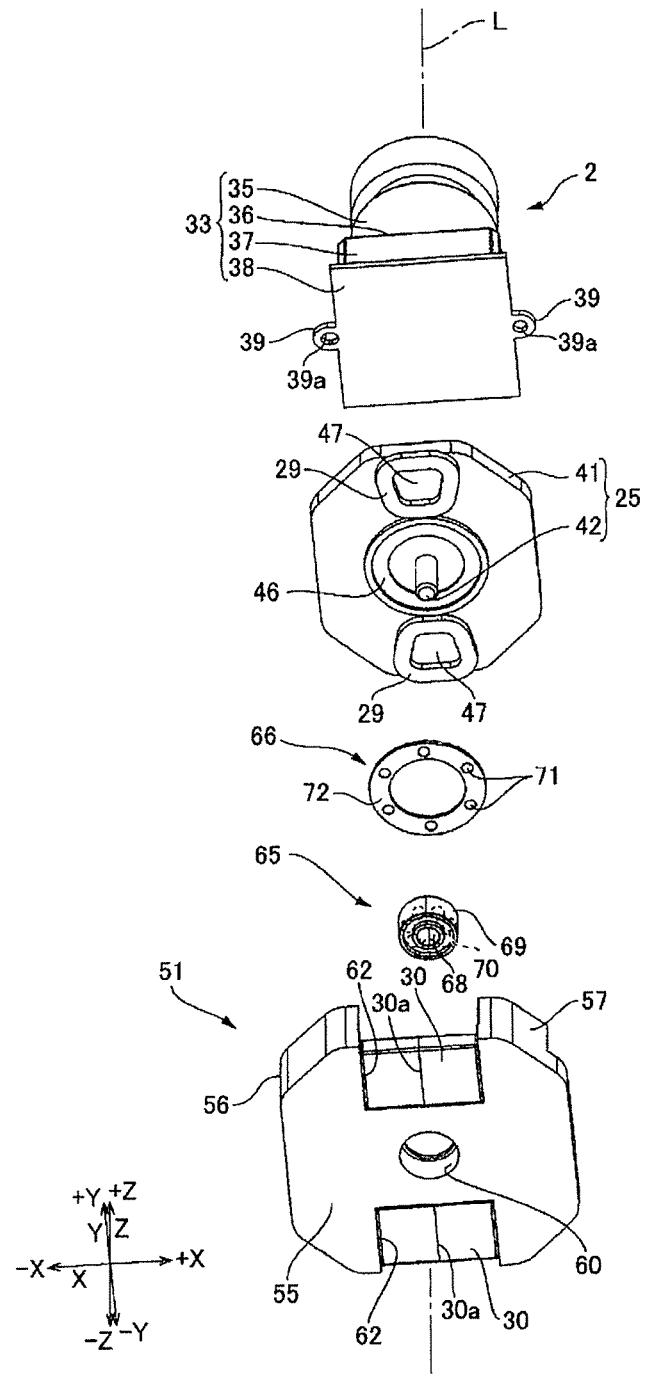
FIG. 8 is an exploded perspective view of the imaging module, the rotation seat, the rotation supporting mechanism, and the supporting member, in which the imaging module, the rotation seat, the rotation supporting mechanism, and the supporting member are seen from the counter object side.

FIG. 5 is an exploded perspective view of the movable member 3, in which the movable member 3 is seen from the object side. FIG. 6 is an exploded perspective view of the movable member 3, in which the movable member 3 is seen from the counter object side. FIG. 7 is an exploded perspective view of the imaging module 2, a rotation seat, a rotation supporting mechanism, and a supporting member, in which the imaging module 2, the rotation seat, the rotation supporting mechanism, and the supporting member are seen from the object side. FIG. 8 is an exploded perspective view of the imaging module 2, the rotation seat, the rotation supporting mechanism, and the supporting member, in which the imaging module 2, the rotation seat, the rotation supporting mechanism, and the supporting member are seen from the counter object side.

As illustrated in FIG. 2, the movable member 3 includes: the imaging module 2; a rotation seat 25 (i.e., a rotation member) that supports the imaging module 2 from a −Z direction side; a rotation supporting mechanism 26 that supports the rotation seat 25 such that the rotation seat 25 is able to rotate on the axis L; and a supporting member 27 that supports the rotation seat 25 via the rotation supporting mechanism 26. The movable member 3 also includes a rolling magnetic driving mechanism 28 that causes the rotation seat 25 (i.e., the imaging module 2) to rotate. The rolling magnetic driving mechanism 28 includes: rolling driving coils 29 that are fixed to the rotation seat 25; and rolling driving magnets 30 that are fixed to the supporting member 27.

(Imaging Module)

As illustrated in FIG. 2, the imaging module 2 includes: an optical element 31 such as a lens; an imaging element 32 that is arranged on the optical axis of the optical element 31; and a housing 33 that holds the optical element 31 and the imaging element 32. As illustrated in FIGS. 7 and 8, the housing 33 includes: a mirror cylinder 35 that holds the optical element 31 on its inner circumferential side; an end plate 36 that is in a rectangular shape and expands from a −Z direction side-end edge of the mirror cylinder 35 in a direction orthogonal to the axis L, toward the outer circumferential side; a housing frame part 37 that is in a rectangular shape and extends from the outer circumferential edge of the end plate 36 toward the −Z direction; and a sealing plate 38 that seals a −Z direction side-opening part of the housing frame part 37.

The imaging element 32 is in a rectangular shape in which the imaging element 32 is seen from the Z-axis direction. In a state where the imaging element 32 is mounted on the sealing plate 38, the imaging element 32 is fitted to the inner circumferential side of the housing frame part 37 from the −Z direction and is thus fixed to the housing 33. The sealing plate 38 is provided, on its X-axis direction side-ends, with protrusion parts 39. Each of the protrusion parts 39 is formed with a position-determining through hole 39a that penetrates in the Z-axis direction.

(Rotation Seat)

As illustrated in FIG. 8, the rotation seat 25 includes: a seat main body 41 that is in a plate shape perpendicular to the axis L; and a shaft part 42 that protrudes from a center of the seat main body 41 in the −Z direction. The seat main body 41 has a planar shape that is an octagonal shape longer in the Y-axis direction, in which the seat main body 41 is seen from the Z-axis direction. The seat main body 41 includes: a side that is located at a +X direction-end and extends in the Y-axis direction; a side that is located at a −X direction-end and extends in the Y-axis direction; a side that is located at a +Y direction-end and extends in the X-axis direction; a side that is located at a −Y direction-end and extends in the X-axis direction; and four oblique sides each connecting between two of the sides adjoining each other in the circumferential direction.

As illustrated in FIG. 7, a pair of grooves 43 that extend in parallel to the X-axis direction are formed on Y-axis direction-sides of a +Z direction-end surface of the seat main body 41 across the shaft part 42. A magnetic member 44 that is in a rectangular plate shape and extends in the X-axis direction is inserted into and fixed to each groove 43. Position-determining projections 45 are respectively provided on X-axis direction-side end edge portions of the +Z direction-end surface of the seat main body 41. In supporting the imaging module 2 on the rotation seat 25, the position-determining projections 45 are respectively inserted into the position-determining through holes 39a in the sealing plate 38 of the imaging module 2. The optical axis of the imaging module 2 is thus arranged coaxially with a center line (i.e., the axis L) of the shaft part 42 on the rotation seat 25.

As illustrated in FIG. 8, a seat-side annular groove 46 is provided in a −Z direction-end surface of the seat main body 41 and on an outer circumferential side of the shaft part 42. The seat-side annular groove 46 is formed coaxially with the shaft part 42. Furthermore, a pair of coil fixation parts 47 are provided on Y-axis direction-sides across the shaft part 42 and on an outer circumferential side of the seat-side annular groove 46. On each of the coil fixation parts 47, the rolling driving coil 29 is fixed in such a posture that a central hole in the rolling driving coil 29 faces in the Z-axis direction.

Here, the imaging module 2 and the rotation seat 25 supporting the imaging module 2 configure a rotation member 40 that rotates on the axis L.

(Supporting Member)

As illustrated in FIGS. 5 and 6, the supporting member 27 includes; a supporting member 51; a frame member 52 that is stacked on a +Z direction side of the supporting member 51; and a coil holder member 53 that is stacked on a +Z direction side of the frame member 52.

As illustrated in FIG. 8, the supporting member 51 includes; a supporting part 55 that is in a plate shape and is opposed to the rotation seat 25 from the −Z direction; and a first wall part 56, a second wall part 57, and a third wall part 58 that protrude from an outer circumferential edge portion of the supporting part 55 in the +Z direction. The supporting part 55 has in its central portion a bearing holding hole 60. The supporting part 55 also has in its +Z direction-end surface a supporting member-side annular groove 61 that coaxially encloses the bearing holding hole 60. The supporting member-side annular groove 61 is provided at a position overlapping with the seat-side annular groove 46, in which the supporting member-side annular groove 61 is seen from the Z-axis direction.

The supporting part 55 also has a pair of cutout parts 62 that are provided on an outer circumferential side of the supporting member-side annular groove 61. The cutout parts 62 are obtained by cutting out a +Y direction-outer circumferential edge and a −Y direction-outer circumferential edge of the supporting part 55 toward the axis L. Each of the cutout parts 62 is in a rectangular shape. A rolling driving magnet 30 that is in a rectangular shape is fitted to and held by each cutout part 62. Each of the rolling driving magnets 30 is polarized and magnetized into two in the circumferential direction, and a magnetization polarized line 30a thereof extends in the radial direction orthogonal to the axis L. Here, the supporting member 51 of which the cutout parts 62 respectively hold the rolling driving magnets 30 is in an octagonal shape, in which the supporting member 51 is seen from the Z-axis direction. In other words, the supporting member 51 has: two sides that are opposed to each other in the X-axis direction and extend in the Y-axis direction; two sides that are opposed to each other in the Y-axis direction and extend in the X-axis direction; and four oblique sides each connecting between two of the sides adjoining each other in the circumferential direction.

The first wall part 56 protrudes toward the +Z direction from an outer circumferential edge portion including the side extending in the Y direction on the −X direction-end and the two oblique sides on the circumferential ends of this side, at an outer circumferential edge of the supporting part 55. The second wall part 57 protrudes toward the +Z direction from an outer circumferential edge portion including the oblique sides on the +X direction-end and +Y direction-end, at the outer circumferential edge of the supporting part 55. The third wall part 58 protrudes toward the +Z direction from an outer circumferential edge portion including the oblique sides on the +X direction-end and −Y direction-end, at the outer circumferential edge of the supporting part 55. Each of the wall parts has a +Z direction-tip end surface in which a position-determining depression part 63 is provided.

Here, the rotation seat 25 is supported by the supporting member 51 via the rotation supporting mechanism 26 such that the rotation seat 25 is able to rotate. The rotation supporting mechanism 26 includes a bearing part 65 and a rotation supporting part 66. The rotation supporting part 66 is located at an outer circumferential side of the bearing part 65. As illustrated in FIGS. 7 and 8, the bearing part 65 is a ball bearing including: an inner ring 68; an outer ring 69 that is opposed to the inner ring 68 in the radial direction; and balls 70 that are arranged between the inner ring 68 and the outer ring 69. The rotation supporting mechanism 26 includes: six roll moving members 71 that are inserted between the seat-side annular groove 46 and the supporting member-side annular groove 61; and a retainer 72 that holds the roll moving members 71 between the seat-side annular groove 46 and the supporting member-side annular groove 61 such that the roll moving members 71 are able to roll.

The bearing part 65 is held inside the bearing holding hole 60, and the shaft part 42 of the rotation seat 25 is inserted into the inner ring 68. The rotation seat 25 is thus supported from a direction orthogonal to the axis L such that the rotation seat 25 is able to rotate. Furthermore, the rotation seat 25 is supported by the supporting member 51 from the −Z direction via the roll moving members 71 arranged between the supporting member-side annular groove 61 and the seat-side annular groove 46 such that the rotation seat 25 is able to rotate. As illustrated in FIG. 5, in the state where the rotation seat 25 is supported by the supporting member 51, the first wall part 56 is located at an outer circumferential side of the side extending in the Y-axis direction on the −X direction-end of the seat main body 41 and at outer circumferential sides of the two oblique sides on the circumferential ends of this side. The second wall part 57 is located at outer circumferential sides of the oblique sides on the +X direction-end and +Y direction-end of the seat main body 41. The third wall part 58 is located at outer circumferential sides of the oblique sides on the +X direction-end and −Y direction-end of the seat main body 41.

Furthermore, in the state where the rotation seat 25 is supported by the supporting member 51, as illustrated in FIG. 2, the rolling driving magnets 30 held by the supporting member 51 are opposed to the rolling driving coils 29 held by the rotation seat 25 with a narrow gap in the Z-axis direction. Here, each of the rolling driving coils 29 has two long edge portions extending in the radial direction. The two long edge portions are located at sides across the magnetization polarized line 30a of the corresponding rolling driving magnet 30 and are utilized as effective edges. Furthermore, in the state where the rotation seat 25 is supported by the supporting member 51, the magnetic members 44 held by the rotation seat 25 are located opposite the rolling driving magnets 30 across the rolling driving coils 29. Each of the magnetic members 44 is arranged at a position overlapping with the magnetization polarized line 30a of the corresponding rolling driving magnet 30 when being seen from the Z-axis direction.

Here, the two magnetic members 44 fixed to the rotation seat 25 and the two rolling driving magnets 30 configuring the rolling magnetic driving mechanism 28 configure a posture recovering mechanism 75 that recovers the rotation seat 25 to a predetermined reference angular position. In other words, when the rotation seat 25 rotates from the reference angular position, the circumferential centers of the magnetic members 44 move away from the magnetization polarized line 30a of the rolling driving magnets 30 in the circumferential direction. Therefore, magnetic attractive force in such a direction that the centers of the magnetic members 44 correspond to the angular position of the magnetization polarized line 30a of the rolling driving magnets 30 is exerted between the magnetic members 44 and the rolling driving magnets 30. Such magnetic attractive force allows the posture recovering mechanism 75 to recover the rotation seat 25 to the reference angular position.

Furthermore, the three wall parts 56, 57, and 58 of the supporting member 51 are able to abut against the rotation seat 25 from the circumferential direction when the rotation seat 25 rotates more than a predetermined angle range with respect to the reference angular position. Therefore, each of the three wall parts 56, 57, and 58 functions as a rotation stopper part that defines a rotation angle range of the rotation seat 25.

Next, as illustrated in FIG. 5, the frame member 52 includes: a plate part 78 that is in an octagonal frame shape; and a square tube part 79 that is in an octagonal shape and rises in the +Z direction from an end edge portion on an inner circumferential side of the plate part 78. As illustrated in FIG. 6, the plate part 78 has a −Z direction-end surface that is provided with a plurality of position-determining projections 80. The plate part 78 is mounted on a +Z direction-tip end surface of each of the wall parts 56, 57, and 58 in the supporting member 51. At this time, the position-determining projections 80 of the plate part 78 are respectively inserted into the position-determining depression parts 63 in the wall parts 56, 57, and 58. The position of the frame member 52 is thus determined with respect to the axis L. In the state where the plate part 78 is mounted on the tip end surface of each of the wall parts 56, 57, and 58, the housing frame part 37 of the imaging module 2 is located radially inside the square tube part 79. As illustrated in FIG. 5, a pair of position-determining projections 81 are provided on sides of a +Z direction-tip end surface of the square tube part 79 across the axis L.

The coil holder member 53 includes: a bottom frame part 85 that is in a substantially octagonal shape when the bottom frame part 85 is seen from the Z-axis direction; a pair of sidewall parts 87 and 88 that rise in the +Z direction from X-axis direction ends of the bottom frame part 85 and extend in the Y-axis direction; and a pair of sidewall parts 89 and 90 that rise in the +Z direction from Y-axis direction ends of the bottom frame part 85 and extend in the X-axis direction. Furthermore, the coil holder member 53 includes a pair of sidewall parts 91 that protrude from +X direction- and −Y direction-end portions of the bottom frame part 85 and from −X direction- and +Y direction-end portions of the bottom frame part 85. Each of the sidewall parts 91 has a +Z direction-end portion that is provided with a second swing supporting part 92 for the swing supporting mechanism 4.

As illustrated in FIGS. 5 and 6, furthermore, the coil holder member 53 has a through hole 93 that is formed at a center of the bottom frame part 85. The through hole 93 has an inner diameter that is longer than an outer diameter of the mirror cylinder 35 in the imaging module 2. As illustrated in FIG. 6, a pair of position-determining depression parts 94 are provided on sides of a −Z direction-end surface of the bottom frame part 85 across the through hole 93 in the X-axis direction.

The bottom frame part 85 of the coil holder member 53 is mounted on a +Z-axis direction-tip end surface of the square tube part 79 in the frame member 52. At this time, the position-determining projections 81 of the square tube part 79 are inserted into the position-determining depression parts 94 in the bottom frame part 85, so that the position of the coil holder member 53 is determined with respect to the axis L. In the state where the coil holder member 53 is stacked on the supporting member 51 with the frame member 52 interposed between the coil holder member 53 and the supporting member 51, the mirror cylinder 35 of the imaging module 2 passes through the through hole 93. Accordingly, sidewall parts 87, 88, 89, 90, and 91 are located on an outer circumferential side of the mirror cylinder 35 in the imaging module 2.

Each of the sidewall parts 87, 88, 89, and 90 has an outside surface that is directed radially outward and is provided with a coil fixation part 95. As illustrated in FIGS. 5 and 6, a swing driving coil 7 is fixed to each coil fixation part 95 such that a central hole of the swing driving coil 7 is directed outward in the radial direction. Note that a Hall element 96 is fixed to each of the coil fixation part 95 of the sidewall part 88 on the −X direction side and the coil fixation part 95 of the sidewall part 90 on the −Y direction side. The Hall element 96 is located at the center of each swing driving coil 7 with respect to the Z-axis direction.

(Swing Supporting Mechanism)

Figure 9:
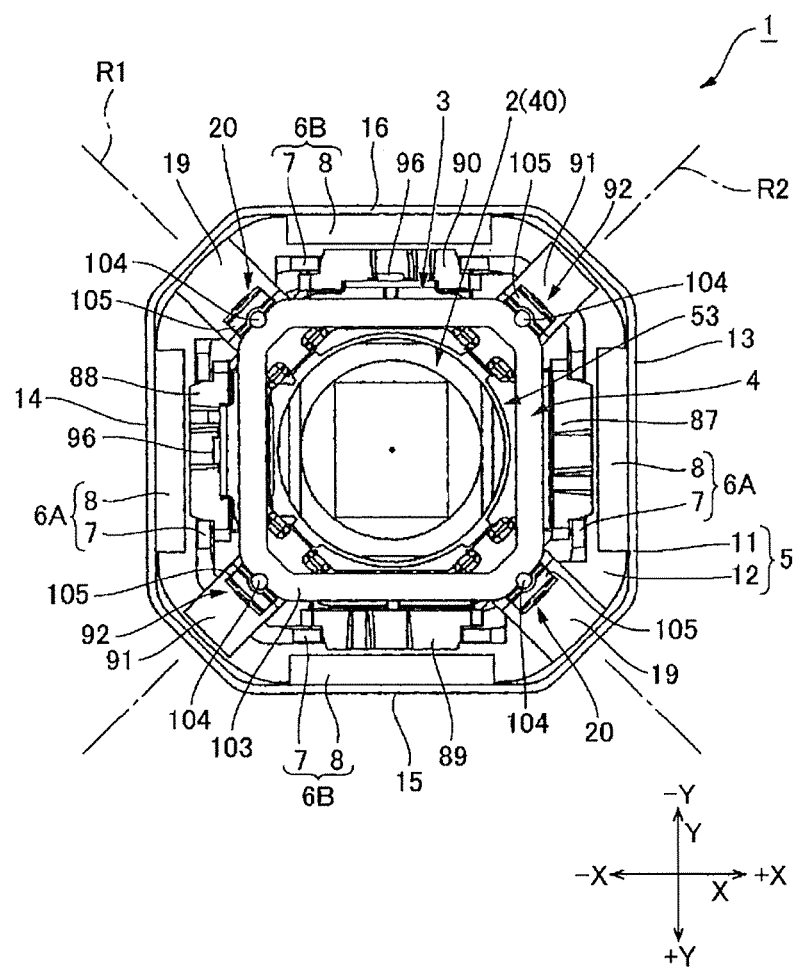
FIG. 9 is a cross-sectional view of the optical unit of FIG. 1, in which the optical unit is taken along a plane that is orthogonal to an axis.

FIG. 9 is a cross-sectional view of the optical unit 1 taken along a plane that is orthogonal to the Z axis (i.e., the axis L) and passes through the swing supporting mechanism 4. The swing supporting mechanism 4 is configured between the frame-shaped member 12 of the fixation member 5 and the coil holder member 53 of the movable member 3. As illustrated in FIG. 9, the swing supporting mechanism 4 includes: the first swing supporting parts 20 of the arm parts 19 that are provided at diagonal positions on the first axis R1 (i.e., the swing center line) of the frame-shaped member 12; the second swing supporting parts 92 of the sidewall parts 91 that are provided at diagonal positions on the second axis R2 (i.e., the swing center line) of the coil holder member 53; and a movable frame 103 that is supported by the first swing supporting parts 20 and the second swing supporting parts 92. Here, the first axis R1 and the second axis R2 are in respective directions that are orthogonal to the Z-axis direction and face diagonally at 45 degrees relative to the X-axis direction and the Y-axis direction. Therefore, the first swing supporting parts 20 and the second swing supporting parts 92 are arranged in respective angular positions that are between the X-axis direction and the Y-axis direction. As illustrated in FIGS. 3 and 4, each of the first swing supporting parts 20 is a cutout depression part obtained by cutting out, from the +Z direction side and the inner circumferential side, a tip portion of the corresponding arm part 19 of the frame-shaped member 12 in the fixation member 5. As illustrated in FIGS. 3 and 5, each of the second swing supporting parts 92 is a cutout depression part obtained by cutting out, from the +Z direction side and the inner circumferential side, a tip portion of the corresponding sidewall part 91 of the coil holder member 53 in the movable member 3.

As illustrated in FIG. 9, the movable frame 103 is a plate-shaped spring whose planar shape is substantially rectangle when the movable frame 103 is seen from the Z-axis direction. Metallic balls 104 are fixed by way of welding, etc., to outside surfaces of four corners of the movable frame 103. The balls 104 respectively make point-contact with contact springs 105 that are held by the first swing supporting parts 20, which are provided on the frame-shaped member 12 of the fixation member 5, and by the second swing supporting parts 92, which are provided on the coil holder member 53. As illustrated in FIGS. 3 and 4, the contact springs 105 are plate-shaped springs each bent in a substantially U shape. Further, the contact springs 105 held by the first swing supporting parts 20 are elastically deformable in the first axis R1 direction, and the contact springs 105 held by the second swing supporting parts 92 are elastically deformable in the second axis R2 direction. Therefore, the movable frame 103 is supported such that the movable frame 103 is able to rotate on each of the two directions (i.e., the first axis R1 direction and the second axis R2 direction), which are orthogonal to the Z-axis direction.

(Swing Magnetic Driving Mechanism)

As illustrated in FIG. 9, the swing magnetic driving mechanism 6 includes a first swing magnetic driving mechanism 6A and a second swing magnetic driving mechanism 6B, which are provided between the coil holder member 53 of the movable member 3 and the cylinder member 11 of the fixation member 5. The first swing magnetic driving mechanism 6A includes two pairs of swing driving magnets 8 and swing driving coils 7, which are opposed to each other in the X-axis direction. The second swing magnetic driving mechanism 6B includes two pairs of swing driving magnets 8 and swing driving coils 7, which are opposed to each other in the Y-axis direction.

The swing driving coils 7 are respectively held on outside surfaces of the sidewall parts 87 and 88 and on outside surfaces of the Y-axis direction-side sidewall parts 89 and 90 of the coil holder member 53 in the movable member 3. The swing driving magnets 8 are respectively held on inside surfaces of the side plates 13, 14, 15, and 16 provided on the cylinder member 11. As illustrated in FIGS. 2, 3, and 4, each of the swing driving magnets 8 is polarized and magnetized with respect to the Z-axis direction such that the magnetic poles on the inside surfaces are different with reference to a magnetization polarized line 8a. As for the swing driving coils 7, the long edge portions on the +Z direction side and on the −Z direction side are utilized as effective edges. When the movable member 3 is in the reference posture, each Hall element 96 is opposed to the magnetization polarized line 8a of each swing driving magnet 8, which is located on the outer circumferential side. Here, the cylinder member 11 is made of magnetic material, and therefore the cylinder member 11 functions as a yoke for the swing driving magnets 8.

The two pairs of the second swing magnetic driving mechanisms 6B, which are located on the +Y direction side and on the −Y direction side of the movable member 3, are connected by wiring such that magnetic driving force is generated in the same direction at the periphery of the X axis when power is supplied to the swing driving coils 7. Furthermore, the two pairs of the first swing magnetic driving mechanisms 6A, which are located on the +X direction side and on the −X direction side of the movable member 3, are connected by wiring such that magnetic driving force is generated in the same direction at the periphery of the Y axis when power is supplied to the swing driving coils 7. The swing magnetic driving mechanism 6 causes the imaging module 2 to rotate on the first axis R1 and on the second axis R2, by way of synthesizing rotation on the X axis, which is caused by the second swing magnetic driving mechanisms 6B, and rotation on the Y axis, which is caused by the first swing magnetic driving mechanisms 6A. In a case of performing shake correction on the X axis and shake correction on the Y axis, the rotation on the first axis R1 and the rotation on the second axis R2 are synthesized.

Here, as illustrated in FIG. 2, the −direction-side portion of the inner circumferential surface of the frame part 18 of the frame-shaped member 12 of the fixation member 5 is a swing stopper part 110 (i.e., a stopper part) that restrains a swing range of the movable member 3. In other words, the −Z direction-side inner circumferential surface portion of the inner circumferential surface of the frame part 18 is a tilting surface that tilts relative to the outer circumferential side in the −Z direction. When the movable member 3 is in the tilting posture exceeding a predetermined swing range, the tilting surface (i.e., the swing stopper part 110) is abutted against the frame member 52 of the supporting member 27 to restrain further tilting of the movable member 3. Furthermore, when the movable member 3 moves in the +Z direction by means of external force, the −Z direction-end surface of the frame-shaped member 12 is abutted against the plate part 78 of the frame member 52 in the supporting member 27 to prevent the movable member 3 from further moving in the +Z direction.

As described above, the frame-shaped member 12 is provided with the pair of arm parts 19 at the diagonal positions. Further, a part of the swing supporting mechanism 4 is formed to configure the swing center line (i.e., the first axis R1). In other words, the frame-shaped member 12 is configured such that two functions of the swing supporting mechanism 4 and the swing stopper part 110 (i.e., the stopper part) configured on the fixation member side are used together. Furthermore, the frame-shaped member 12 is fixed to the −Z direction-opening part in the cylinder member 11 being the fixation member 5. As illustrated in FIG. 2, the frame-shaped member 12 is arranged between the swing magnetic driving mechanism 6 and the rolling magnetic driving mechanism 28 in the optical axis direction.

(Shake Correction of Optical Unit)

The optical unit 1 includes the rolling magnetic driving mechanism 28 that rotates the rotation member 40 including the imaging module 2 and the rotation seat 25. Therefore, the optical unit 1 is capable of performing shake correction in a rolling direction. The optical unit 1 also includes the swing magnetic driving mechanism 6 that causes the rotation member 40 (i.e., the imaging module 2) to swing and performs shake correction on the X axis and shake correction on the Y axis. Therefore, the optical unit 1 is capable of performing shake correction in a pitching (i.e., vertical swing) direction and in a yawing (i.e., transverse swing) direction. Here, the optical unit 1 includes, for example, a gyroscope in the imaging module 2, and therefore the optical unit 1 detects shake on three axes that are orthogonal to each other by use of the gyroscope, so as to drive the swing magnetic driving mechanism 6 and the rolling magnetic driving mechanism 28 such that the detected shake is offset.

(Functional Effects)

In the present embodiment, the imaging module 2 and the rotation seat 25 configure the rotation member 40 that rotates on the optical axis (i.e., the axis L) of the imaging module 2. Further, the rotation member 40 does not include the swing supporting mechanism 4 and the swing magnetic driving mechanism 6 for swinging the imaging module 2. It is therefore possible to reduce the weight of the rotation member 40 as compared with a case where the swing supporting mechanism 4 and the swing magnetic driving mechanism 6 rotate together with the imaging module 2. It is thus possible to suppress an increase of inertia generated on the rotation member 40 in rolling correction. It is therefore possible to improve followability and to perform rolling correction with good accuracy. It is also possible to prevent an increase of the weight of the rotation member 40, and it is therefore possible to reduce power consumption for rotating the rotation member 40 in the rolling magnetic driving mechanism 28. On the other hand, the optical unit 1 includes: the fixation member 5 that supports the movable member 3 including the rotation member 40 (i.e., the imaging module 2) via the swing supporting mechanism 4 such that the movable member 3 is able to swing; and the swing magnetic driving mechanism 6 that causes the movable member 3 to swing. The optical unit 1 is therefore capable of performing swing correction.

Furthermore, in the present embodiment, the rolling driving coils 29 and the rolling driving magnets 30 of the rolling magnetic driving mechanism 28 are opposed to each other in the optical axis direction (i.e., the axis L direction). It is accordingly possible to avoid the movable member 3 from becoming large in size in a direction orthogonal to the axis L. On the other hand, the swing driving magnets 8 and the swing driving coils 7 of the swing magnetic driving mechanism 6 are opposed to each other in the radial direction. It is therefore possible to avoid the optical unit 1 from becoming large in size in the axis L direction. Furthermore, the swing magnetic driving mechanism 6 is located closer to the +Z direction side than the rolling magnetic driving mechanism 28. It is therefore possible to separate the swing magnetic driving mechanism 6 from the rolling magnetic driving mechanism 28 in the axis L direction.

Also in the present embodiment, the frame-shaped member 12 of the fixation member 5 is provided with the swing stopper part 110 that is abutted against the supporting member 27 to restrain the swing range of the movable member 3 when the movable member 3 excessively swings. It is accordingly possible to restrain the swing range of the movable member 3.

VARIATION EXAMPLES

Note that in the rolling magnetic driving mechanism 28, the rolling driving magnets 30 may be held on the rotation seat 25 side, and the rolling driving coils 29 may be held on the supporting member 27 side. In this case, the magnetic members 44 are located at positions opposed to the magnetization polarized line 30a of the rolling driving magnets 30 across the rolling driving coils 29, on the supporting member 27 side.

In the swing magnetic driving mechanism 6, the swing driving magnets 8 may be held on the movable member 3 side, and the swing driving coils 7 may be held on the fixation member 5 side.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correction function comprising:
   a movable member that includes
      an imaging module including an optical element and an imaging element,
      a rotation member configured to support the imaging module,
      a rotation supporting mechanism configured to support the rotation member such that the rotation member is able to rotate on an optical axis of the imaging module,
      a supporting member configured to support the rotation member via the rotation supporting mechanism, and
      a rolling magnetic driving mechanism configured to cause the rotation member to rotate;
   a swing supporting mechanism that supports the movable member such that the movable member is able to swing in a range between a reference posture, in which a predetermined axis corresponds to the optical axis of the imaging module, and a tilting posture, in which the optical axis tilts relative to the predetermined axis;
   a fixation member that supports the movable member via the swing supporting mechanism; and
   a swing magnetic driving mechanism that causes the movable member to swing,
   the supporting member includes: the rotation supporting mechanism; a frame member that is stacked on a +Z direction side of the rotation supporting mechanism;

and a coil holder member that is stacked on a +Z direction side of the frame member.

2. The optical unit with shake correction function according to claim 1,
wherein the rolling magnetic driving mechanism includes:
a rolling driving coil that is provided on either one of the rotation member and the supporting member; and
a rolling driving magnet that is provided on the other one of the rotation member and the supporting member, and
wherein the rolling driving coil and the rolling driving magnet are opposed to each other in an optical axis direction.

3. The optical unit with shake correction function according to claim 2,
wherein the swing magnetic driving mechanism includes:
a swing driving coil that is provided on either one of the supporting member and the fixation member; and
a swing driving magnet that is provided on the other one of the supporting member and the fixation member, and
wherein the swing driving coil is opposed to the swing driving magnet in a direction orthogonal to the predetermined axis.

4. The optical unit with shake correction function according to claim 3, wherein the swing magnetic driving mechanism is located closer to an object side than the rolling magnetic driving mechanism.

5. The optical unit with shake correction function according to claim 4,
wherein the rotation member supports the imaging module from a counter object side,
wherein the supporting member includes a supporting part that is opposed to the rotation member from the counter object side, and
wherein either one of the rolling driving coil and the rolling driving magnet is held by the rotation member while the other one of the rolling driving coil and the rolling driving magnet is held by the supporting part.

6. The optical unit with shake correction function according to claim 5,
wherein the imaging module includes a mirror cylinder that holds the optical element,
wherein the supporting member includes a sidewall part that is located on an outer circumferential side of the mirror cylinder,
wherein the fixation member includes a cylinder member that is located on the outer circumferential side of the mirror cylinder and on an outer circumferential side of the sidewall part, and
wherein either one of the swing driving coil and the swing driving magnet is held by the sidewall part while the other one of the swing driving coil and the swing driving magnet is held by the cylinder member.

7. The optical unit with shake correction function according to claim 1, wherein the fixation member includes a stopper part that is abutted against the supporting member to restrain a swing range of the movable member when the movable member swings.

8. The optical unit with shake correction function according to claim 7,
wherein the swing magnetic driving mechanism is located closer to an object side than the rolling magnetic driving mechanism, and
wherein the stopper part is arranged between the swing magnetic driving mechanism and the rolling magnetic driving mechanism in an optical axis direction.

9. The optical unit with shake correction function according to claim 8,
wherein a frame-shaped member formed with a tilting surface is fixed to the fixation member, and
wherein the stopper part restrains the swing range of the movable member when the tilting surface is abutted against the movable member.

10. The optical unit with shake correction function according to claim 9, wherein the frame-shaped member is configured with a pair of swing supporting parts that configure a swing center line of the swing supporting mechanism.

* * * * *